(12) United States Patent
Riedel et al.

(10) Patent No.: US 11,986,954 B2
(45) Date of Patent: May 21, 2024

(54) ROBOTIC ARM COMPRISING CASING SHELLS CONNECTED BY AT LEAST ONE LINEAR CONNECTION ELEMENT

(71) Applicant: KUKA Deutschland GmbH, Augsburg (DE)

(72) Inventors: Martin Riedel, Augsburg (DE); Andre Reekers, Augsburg (DE)

(73) Assignee: KUKA Deutschland GmbH (DE)

( * ) Notice: Subject to any disclaimer, the term of this patent is extended or adjusted under 35 U.S.C. 154(b) by 540 days.

(21) Appl. No.: 17/267,620

(22) PCT Filed: Jul. 31, 2019

(86) PCT No.: PCT/EP2019/070641
§ 371 (c)(1),
(2) Date: Feb. 10, 2021

(87) PCT Pub. No.: WO2020/030496
PCT Pub. Date: Feb. 13, 2020

(65) Prior Publication Data
US 2021/0323176 A1 Oct. 21, 2021

(30) Foreign Application Priority Data
Aug. 10, 2018 (DE) ...................... 10 2018 213 499.5

(51) Int. Cl.
*B25J 19/00* (2006.01)
*F16B 1/00* (2006.01)

(52) U.S. Cl.
CPC ....... *B25J 19/0075* (2013.01); *B25J 19/0083* (2013.01); *F16B 1/00* (2013.01)

(58) Field of Classification Search
CPC .. B25J 9/0009; B25J 19/0075; B25J 19/0083; F16B 1/00; Y10T 24/45168;
(Continued)

(56) References Cited

U.S. PATENT DOCUMENTS 6,308,541 B1 * 10/2001 Stowe .................... A45C 13/18
70/68
2002/0144565 A1 10/2002 Ambrose
(Continued)

FOREIGN PATENT DOCUMENTS

| CN | 102699929 A | 10/2012 |
| CN | 106799746 A | 6/2017 |

(Continued)

OTHER PUBLICATIONS

Lipoff, S. (Jan. 29, 2016). Upcycle it! plastic-bottle zipper container. Popsugar. https://www.popsugar.com/smart-living/plastic-bottle-zipper-container-31009775 (Year: 2016).*
(Continued)

*Primary Examiner* — Joseph Brown
(74) *Attorney, Agent, or Firm* — Dorton & Willis, LLP

(57) ABSTRACT

A robotic arm includes a plurality of joints and a plurality of links, each connecting two adjacent joints to one another in a fixed arrangement. At least one of the links includes at least one first casing shell and at least one second casing shell, wherein the first casing shell is connected to the second casing shell in a form-fitting manner in order to form a hollow link, and wherein structure connecting the casing shells includes at least one zip fastener.

13 Claims, 9 Drawing Sheets

(58) Field of Classification Search
CPC ........... B65D 2543/00074; B65D 2543/00092; A44B 19/02–19/64
See application file for complete search history.

(56) References Cited

U.S. PATENT DOCUMENTS

| | | | |
|---|---|---|---|
| 2004/0154942 A1* | 8/2004 | Streich | E05B 65/5238 206/349 |
| 2006/0261207 A1 | 11/2006 | Woodruff et al. | |
| 2010/0292707 A1 | 11/2010 | Ortmaier et al. | |
| 2015/0340128 A1* | 11/2015 | Lee | A44B 19/38 29/408 |
| 2016/0325303 A1* | 11/2016 | Schwab | B05B 16/90 |
| 2017/0251771 A1* | 9/2017 | Wang | A45C 7/0027 |
| 2018/0078008 A1* | 3/2018 | Sturm | A44B 19/32 |
| 2018/0207795 A1* | 7/2018 | Haddadin | B25J 9/0009 |
| 2020/0290218 A1 | 9/2020 | Hannig | |

FOREIGN PATENT DOCUMENTS

| | | |
|---|---|---|
| DE | 8323723 U1 | 12/1983 |
| DE | 202007006121 U1 | 8/2007 |
| DE | 102012208430 A1 | 11/2013 |
| DE | 102015012960 A1 | 2/2017 |
| DE | 102008005901 B4 | 8/2018 |
| EP | 2868445 A1 | 5/2015 |
| IL | 67505 A | 9/1985 |
| WO | WO-2010060561 A1 * | 6/2010 ......... B25J 19/0075 |
| WO | 2015024818 A1 | 2/2015 |
| WO | 2016196165 A1 | 12/2016 |
| WO | 2017029263 A1 | 2/2017 |
| WO | 2017157405 A1 | 9/2017 |

OTHER PUBLICATIONS

Chinese Patent Office; Search Report in related Chinese Patent Application No. 2019800667425 dated Jun. 9, 2023; 2 pages.
Chinese Patent Office; Office Action in related Chinese Patent Application No. 2019800667425 dated Jun. 10, 2023; 3 pages.
European Patent Office; Search Report in related International Patent Application No. PCT/EP2019/070641 dated Oct. 16, 2019; 5 pages.
German Patent Office; Search Report in related German Patent Application No. 10 2018 213 499.5 dated Dec. 3, 2020; 5 pages.
Chinese Patent Office; Office Action in related Chinese Patent Application No. 2019800667425 dated Feb. 22, 2024; 3 pages.

* cited by examiner

ROBOTIC ARM COMPRISING CASING SHELLS CONNECTED BY AT LEAST ONE LINEAR CONNECTION ELEMENT

CROSS-REFERENCE TO RELATED APPLICATIONS

This application is a national phase application under 35 U.S.C. § 371 of International Patent Application No. PCT/EP2019/070641, filed Jul. 31, 2019 (pending), which claims the benefit of priority to German Patent Application No. DE 10 2018 213 499.5, filed Aug. 10, 2018, the disclosures of which are incorporated by reference herein in their entirety.

TECHNICAL FIELD

The invention relates generally to automated robotic machinery and, more particularly, to an improved robotic arm.

BACKGROUND

From WO 2017/029263 A1 a robotic system having at least one robot arm is known, consisting of a plurality of links which are connected to one another via joints and which have a casing for receiving mechanical, mechatronic and/or electronic components, wherein the casing is formed to transmit the torques and forces introduced into the link to an adjoining member, wherein the casing is composed of at least two casing parts of complementary shape which are connected to each other in a torque- and force-transmitting connection. Cast parts made of metal, such as aluminum, plastics or carbon, can be provided as the material for the shell-like casing parts.

SUMMARY

The object of the invention is to create a robotic arm having links, at least one of which has at least one first casing shell and at least one second casing shell, wherein the casing shells on the one hand are particularly stably connected and on the other hand are able to be joined together in a simple manner and/or, if necessary, can be separated.

This object is achieved according to the invention by a robotic arm comprising a plurality of joints and a plurality of links, which each connect two adjacent joints to one another in a fixed arrangement, at least one of the links having at least one first casing shell and at least one second casing shell, and the first casing shell being connected to the second casing shell by connecting means in a form-fitting manner to form a hollow member, wherein the connecting means have at least one zip fastener.

Robotic arms, in particular industrial robots, are work machines that can be equipped with tools for the automatic handling and/or processing of objects, the links of which can be programmed by means of their joints in multiple axes of movement, for example with regard to orientation, position and workflow.

An industrial robot generally has the robotic arm and a programmable controller (control device) that controls or regulates the motion sequences of the industrial robot during operation by moving one or more automatically or manually adjustable joints (robotic axes), in particular by electric motors or drives in which the controller controls or regulates the motors or drives.

Robotic arms can include, inter alia, a frame and a carousel which is mounted rotatably relative to the frame by means of a joint and on which a link arm is pivotably mounted by means of another joint. In turn, an arm extension can be pivotably mounted on the link arm by means of a further joint. The arm extension bears a robotic hand, wherein the arm extension and/or the robotic hand is able to have a plurality of further joints.

The robotic arm comprising a plurality of links connected by joints can be configured as an articulated arm robot with a plurality of links and joints arranged in series, in particular the robotic arm can be designed as a six-axis articulated arm robot or a seven-axis articulated arm robot. In a further embodiment, however, the robotic arm can also be a horizontal articulated arm robot, i.e. a SCARA robot.

A motor or drive and/or a transmission can be assigned to each joint, which for example connects two adjacent links so that they can be adjusted relative to one another. Each transmission is used to translate or reduce a speed or torque introduced by the motor or drive and to enable an adjustment of the respective one link with respect to the adjacent link.

The load to be carried by the robotic arm and to be moved in space can already be formed by a tool, such as a gripper, fastened to a hand flange of the robotic arm. As an alternative or in addition to a tool or gripper, however, the load can also be formed by a workpiece to be handled or processed. In order to be able to hold and move such loads, forces and moments have to be transmitted through the supporting structure of the robotic arm. One or more links of the robot arm can therefore be designed in particular as a casing body with cavities, in which the casing body absorbs all forces and moments of the load, with motors, drives, transmission and/or supply lines being able to be arranged in the cavities of the casing body. The hollow casing bodies are composed of at least two casing shells—the at least one first casing shell and the at least one second casing shell. The at least one first casing shell and the at least one second casing shell have to be connected to one another by connecting means in order to be able to form the complete casing body. According to the invention, the connecting means have at least one zip fastener.

In the context of the invention, links and casing shells are understood to be structural elements that mechanically connect two adjacent joints with one another in such a way that loads in all six degrees of freedom, i.e. translationally in the three Cartesian spatial directions and rotationally around three axes of rotation, each of which is aligned in the three Cartesian spatial directions, can be transmitted. The main materials used are generally metals such as steel or aluminum, in particular in welded, cast or milled constructions. Exceptions are made, for example, for carbon fiber or plastic. Up to now, plastic has only been used for cladding and covers in order to completely or partially cover an underlying metallic structure. The loads have not yet been transmitted in all six degrees of freedom via the cladding and covers, in particular not if they are made of plastic.

However, with the invention it was found that a plastic structure of the links offers a great number of advantages in terms of design and is particularly suitable in particular with regard to very inexpensive robots. However, the rather limited stiffness and resilience of the plastic material is critical here, which requires a design that is particularly load-optimized. However, the solutions according to the invention and their advantages are not limited to links made of plastic, but can also be useful for other materials used, such as aluminum or carbon fiber materials.

The at least one first casing shell can, with the at least one second casing shell, form a load-bearing shell composite of a link of the robotic arm. Such a shell assembly enables the components of the robotic arm to be assembled quickly and easily. The shell composite according to the invention can also improve the maintenance, repair and/or service of components of the robot arm, in particular of electrical cables and electrical components. With the shell composite according to the invention, the rigidity can be good, but this depends on the type of connection technology used for the shells. In particular, the joining points of the casing shell can be problematic, since these joining points generally reduce rigidity and are subject to tolerances.

The shell composite according to the invention can consist of two or more load-bearing elements, for example half-shells or segments, which can usually be viewed as a good compromise between rigidity and ease of assembly/service, in particular with regard to internal cables and electronic components. A special weak point, however, can be the connecting means that connect the segments, i.e. casing shells, to form a shell assembly, which until now has only been carried out selectively, for example in the form of a screw connection or a snap-in connection, if it was a separable connection at all.

Due to the local limitation of the force transmission between the two-dimensionally loaded segments in the prior art, the joining point is locally highly loaded. This can easily lead to local overloading of the material, in particular in the case of plastic segments, in particular in the direct area of threads and/or screws or of nut support surfaces. In addition, creep or relaxation phenomena can occur over time, as a result of which the fastening means of screws and/or nuts are loosened or the components warp and no longer sit on one another in a defined manner.

In the case of unsuitable internal stiffening of the shell segments, arching effects can also occur between the joining points under load.

The aim of the present invention is therefore to improve the connection between two or more shell-like elements, in particular plastic shells, in particular plastic half-shells for robotic links, so that they are not only connected in a stable, rigid and robust manner, but also so that the joining process can be carried out very easily, that is, assembly and/or disassembly becomes possible in a simple manner, in particular quickly and without the need for special machines or hand tools.

The solution variants result from the claims. Certain core ideas of this invention lie, for example, in an optimal load distribution in the joining point. Known removable solutions, on the other hand, are based on local connections between components, for example by means of screws, rivets or hooks. In the prior art, loads such as forces and/or torques are completely or partially only transferred between the components via these local areas, which has been recognized as disadvantageous.

In the present invention, in contrast to the prior art, the loads are particularly advantageously transmitted over a large area, i.e. along at least essentially or completely the entire joining edge between the components. On the one hand, this prevents overloading of the joining means, such as clips, hooks, screws or their threads, in particular in plastic, and, on the other hand, it prevents local overloading of the material around the joining point. Overloading is not only understood to mean failure or breakage of the component, but also local elastic or plastic deformation, which has a negative effect on the overall flexibility or accuracy of the component and thus the robotic arm. Such deformations can occur both over the short term during operation and over the long term, that is to say over days or weeks, for example through creep or relaxation phenomena.

A large-area connection distributes the load evenly or more evenly and reduces the local stresses in the component. This is achieved by establishing a force-transmitting connection along large areas, in particular along the entire joining edge.

Such a force-transmitting connection along large areas, in particular along the entire joining edge of casing shells of a link of the robot arm, has a zip fastener according to the invention.

Accordingly, the robotic arm can comprise a plurality of load-transferring joints and a plurality load-transferring links, each of which connects two adjacent load-transferring joints to one another in a fixed arrangement, wherein at least one of the load-transferring members has at least one first load-transferring casing shell and at least one second load-transferring casing shell, and the first load-transferring casing shell is connected by connecting means in a form-fitting manner to the second load-transmitting casing shell to form a load-transmitting hollow link, wherein the connecting means have at least one zip fastener. Load-transferring joints, load-transferring links and load-transferring casing shells are understood to mean components of the robotic arm which can bear the dead weight of the robot arm itself and, moreover, can also bear a load attached to the robotic arm. The load can be, for example, a tool guided by the robotic arm, a gripper fastened to the flange of the robotic arm and/or a workpiece handled or gripped by the tool or gripper.

A zip fastener according to the invention is understood to mean not only those zip fasteners with a large number of interlocking teeth or staples, as they are already known from the textile sector, but also slide closure strips and pressure closure strips, such as are known, for example, from the field of resealable plastic bags. In general terms, the zip fastener according to the invention thus forms any linear connecting means. From a functional point of view, linear connecting means can be understood to be those connecting means which not only connect one casing shell to the other casing shell at a few discrete points, but at least extensively or completely continuously connect one casing shell and one other casing shell over the longitudinal extents of the respective connecting edges.

The zip fastener can thus be a toothed zip fastener, a toothless zip fastener, a pair of slide closure strips and/or a pair of pressure closure strips.

The zip fastener can have a first band that is attached to the first casing shell and can have a second band that is attached to the second casing shell such that the zip fastener in its closed state covers at least one gap section in the separating plane between the first casing shell and the second casing shell.

In a first basic variant, the first casing shell can have a connecting edge, the second casing shell can have a mating connecting edge which, when the first casing shell and the second casing shell are joined together, rests on the connecting edge of the first casing shell, wherein the zip fastener is designed to absorb both shear forces along connecting edge and mating connecting edge, as well as shear forces transverse to the connecting edge and mating connecting edge, as well as tensile forces perpendicular to the separating plane of connecting edge and mating connecting edge.

The zip fastener according to the invention thus forms a linear connecting means, which in this embodiment not only absorbs tensile forces perpendicular to the connecting plane, but also absorbs shear or transverse forces both longitudinally and transversely to the main connecting direction, i.e. to the longitudinal extension of the connecting edge and mating connecting edge. Compressive forces —perpendicular to the connection plane—can be transmitted via the surfaces of the connecting edge and the mating connecting edge. The connecting means, i.e. the zip fastener according to the invention, can either have many individual shaped elements, i.e. teeth, which interlock in a form-fitting manner, or the zip fastener according to the invention can have a continuous pair of profile lips, i.e. sliding closure strips or pressure closure strips, which are form-fittingly and/or frictionally pressed together.

In this first basic variant, apart from the compressive forces which press the opposite casing shells against one another, all other forces and moments occurring in the relevant link primarily due to the load are transmitted through the zip fastener.

In the further basic design variants described below, additional form-fitting connecting means are described which interact with the respective zip fastener in such a way that forces and moments in certain, i.e. selected directions are kept from the zip fasteners and are passed on via these respective additional form-fitting connecting means to the corresponding zip fastener to relieve this force or moment. In each of these cases, however, there remains at least one direction of force, preferably the tensile force perpendicular to the plane of separation between the connecting edge of the first casing shell and the mating connecting edge of the second casing shell. The tensile force perpendicular to the separating plane of the connecting edge of the first casing shell and the mating connecting edge of the second casing shell can be a partial force component of another force or a more complex force that occurs, for example, when the mating separating plane is not perpendicular to the separating direction in which the first casing shell and the second casing shell are moved apart for separation.

In a second basic variant, the connecting edge of the first casing shell and the mating connecting edge of the second casing shell can be correspondingly formed to be offset to transmit shear forces transverse to the connecting edge and mating connecting edge, wherein the zip fastener is formed to absorb both shear forces along the connecting edge and mating connecting edge and tensile forces perpendicular to the separating line of the connecting edge and the mating connecting edge.

In particular, the connecting edge of the first casing shell and the mating connecting edge of the second casing shell can be correspondingly formed to be offset to transmit shear forces transverse to the connecting edge and mating connecting edge by means of a pin connection or tongue and groove connection, wherein the zip fastener is designed to absorb both shear forces along the connecting edge and mating connecting edge as well as tensile forces perpendicular to the separating line between the connecting edge and the mating connecting edge.

In this second basic embodiment variant, the pin connections or tongue and groove connections can extend along the longitudinal extents of the connecting edge and mating connecting edge, so that the pin connections or tongue and groove connections prevent the first casing shell from deflecting laterally relative to the second casing shell. The corresponding forces then no longer have to be absorbed by the at least one zip fastener.

The connecting edge of the first casing shell and the mating connecting edge of the second casing shell can be correspondingly formed to be offset to transmit shear forces transverse to the connecting edge and mating connecting edge, in that the connecting edge of the first casing shell and/or the mating connecting edge of the second casing shell has a protruding rib to which the other casing shell is flush.

In this embodiment variant, the shear force is transmitted transversely to the main connection direction, i.e. transversely to the longitudinal extension of the connecting edge and mating connecting edge, in a departure from the previous description, by a pair of surfaces on the connecting edge and the mating connecting edge.

In a third basic variant, the connecting edge of the first casing shell and the mating connecting edge of the second casing shell can be correspondingly formed with form-fittingly interlocking teeth to transmit shear forces along the connecting edge and mating connecting edge, wherein the zip fastener is formed to absorb shear forces transverse to the connecting edge and mating connecting edge and tensile forces perpendicular to the separating line between the connecting edge and the mating connecting edge.

The feature according to which the connecting edge of the first casing shell and the mating connecting edge of the second casing shell is correspondingly formed with form-fittingly interlocking teeth to transmit shear forces along the connecting edge and mating connecting edge, means that the first casing shell can be equipped with first teeth and the second casing shell can have correspondingly interlocking second teeth or opposing teeth which interact form-fittingly with the teeth of the first casing shell. This can be designed analogously to a gear pairing, as is known as such from transmission gearwheels.

In this third basic embodiment variant, the teeth transfer forces both longitudinally and transversely to the longitudinal extension of the connecting edge and the mating connecting edge, so that these forces no longer have to be absorbed by the at least one zip fastener.

To form the form-fittingly interlocking teeth, the first casing shell can have teeth protruding from its connecting edge, which have tooth flanks beveled in the longitudinal direction of the connecting edge, in such a way that the teeth taper from the tooth base in the direction of the tooth head, and the second casing shell can have opposing teeth protruding from its mating connecting edge which have opposing tooth flanks correspondingly beveled in the longitudinal direction of the mating connecting edge towards the teeth of the first casing shell, in such a way that the opposing teeth taper from the tooth base in the direction of the tooth tip, and when the first casing shell and the second casing shell are joined together, the tooth flanks are flush with the opposing tooth flanks.

In a fourth basic variant, the connecting edge of the first casing shell and the mating connecting edge of the second casing shell can be correspondingly formed with form-fittingly interlocking teeth to transmit shear forces along the connecting edge and mating connecting edge, and shear forces transverse to the connecting edge and mating connecting edge, wherein the zip fastener is formed only to absorb tensile forces perpendicular to the separating line between the connecting edge and the mating connecting edge.

In this embodiment, the linear connecting means will only absorb tensile forces perpendicular to the connecting plane, a type of load for which it is ideally suited. All other loading directions, such as compressive forces and shear or transverse forces in all other directions, are transmitted via direct contact with the additional functional surface pairings, i.e. the teeth. Although this embodiment is more complex in terms of design, since additional shaped elements are required, it has the advantage that the rigidity and strength at the connection point can be increased again in a targeted manner.

To form the form-fittingly interlocking teeth, the first casing shell can have teeth protruding from its connecting edge, which have tooth flanks beveled in the longitudinal and transverse directions of the connecting edge, in such a way that the teeth taper both from the tooth base in the direction of the tooth tip and in the transverse direction, and the second casing shell can have opposing teeth protruding from its mating connecting edge, which have opposing tooth flanks correspondingly beveled in the longitudinal direction and transverse direction of the mating connecting edge towards the teeth of the first casing shell, in such a way that the opposing teeth taper from the tooth base towards the tooth tip as well as in the transverse direction, and in a joined state the tooth flanks of the first casing shell and second casing shell are flush with the opposing tooth flanks.

This embodiment accordingly provides that serrated or tooth-shaped elevations are placed continuously, i.e. with no or only a few interruptions, on the respective connecting edges of the components of the casing shells of the link, wherein the serrated or tooth-shaped elevations each have a special geometry. This geometry ensures that the components on the one hand sit on one another without play and on the other hand enables loads such as forces and/or moments to be transmitted in all directions—with the exception of the direction of pull. For this purpose, the teeth are each provided twice with beveled functional surfaces, which after joining are in contact with the functional surfaces of the other component in pairs. The geometry is chosen so that the teeth sit on top of one another with a distance between the tooth base of one casing shell and the tooth tip of the other casing shell, whereas the tooth flanks touch. This is necessary to ensure play-free tensioning, which occurs when the zip fastener is closed and the teeth press against one another. In addition to the teeth, an additional web may also be required for a joining partner per connecting edge. This web can be supported on the back of the teeth of the opposite component and absorb forces transverse to the main connecting edge. With this structure, each connecting edge is individually defined in all three spatial directions and is self-supporting.

In order to provide sufficient material thickness for realizing the toothing even with thin, lightweight components, the wall can be thickened in the area of the connecting edge. A supplementary or alternative thickening inward is also possible, but can mean a more complicated demolding, for example during the injection-molding process. A thickening can also be undesirable for optical reasons. However, this effect is very minor and can be concealed well by the external shape.

In a fifth basic embodiment variant, the first casing shell and the second casing shell can be correspondingly formed with form-fittingly interlocking internal stiffening ribs to transmit shear forces along the connecting edge and mating connecting edge, and shear forces transverse to the connecting edge and mating connecting edge, wherein the zip fastener is formed to absorb only tensile forces perpendicular to the separating line of connecting edge and mating connecting edge.

In this variant, maximum rigidity or strength is combined with simple production. A visually unchanged outer surface can be achieved, which is particularly advantageous. In this exemplary variant, the teeth or the toothing are offset inward and supplemented by a rib structure. The ribs of the two components always support each other in such a way that a defined form fit is created in the longitudinal and transverse direction of the main connecting direction.

For example, functional surfaces of the ribs of one component, that is to say of the one casing shell, rest on functional surfaces of the ribs of the other component, that is to say of the other casing shell, so that longitudinal forces can be transmitted. The ribs of one component can, however, also be supported on the front side on the inner lateral surface of the casing shell of the other component and thus transmit transverse forces. Analogously to this, the ribs of the other casing shell are also supported on the surface of one component, i.e. of the one casing shell. The compressive forces between the shells are directed over a support surface along the connecting edges and the tensile forces over the linear connecting means.

The ribs not only assume a stiffening function here, but also have an important role in connection technology. Here it is necessary for the ribs to protrude beyond the respective half-shells at least in the edge regions so that they can reach into the respective other shell when joining. In the middle area of the component shells, the ribs should have recesses so that they do not collide with the ribs of the other component and consequently electrical components and cables can continue to be laid and assembled.

The principle described here is independent of the actual rib shape except for the elements and features mentioned.

In a further modification of this variant, the ribs can also interlock in a form-fitting manner remote from the edge in order to transmit transverse and longitudinal forces, for example by rib elements of one component engaging in slots of another component.

In all versions, the first casing shell can have on its outer jacket wall a receiving channel that adjoins the connecting edge and extends longitudinally along the connecting edge, which is formed to receive the zip fastener at least substantially flush with the outer jacket wall and/or the second casing shell on its outer jacket wall has a receiving channel which adjoins the mating connecting edge and extends longitudinally along the mating connecting edge and is formed to receive the zip fastener at least substantially flush with the outer jacket wall.

Since zip fasteners generally have a slightly bead-like shape and should not rest on the outer jacket surface of the shell for purely visual reasons, a longitudinal receiving groove can be provided along the connecting edge to accommodate the zip fastener cross-section and to make the outside of the zip fastener, in particular, end flush with the outer surface of the shells.

In all embodiments, the zip fastener can have a locking device which is formed to lock a slide of the zip fastener in its closed position.

In the closed state, the zip fastener can thus have locking devices or safety elements that prevent unintentional opening. For this purpose, the zip fastener slider can be manually fixed in the end position or it can have a locking element which is pressed into the zip fastener when the zip flap is folded down and prevents the zip fastener slider from moving along the zip fastener.

In all versions, the zip fastener can have a sealing lip which extends longitudinally over the length of the zip fastener and is formed to cover gaps, openings and/or cracks in the closed zip fastener in a dust-protected and/or splash-proof manner.

The zip fastener can thus have an additional lip on the outside, which rests in the closed state of the zip fastener and thus seals the two half-shells and protects them from dust and splashed water. The frictional, lip-like zip fastener type already includes this function and seals dust-tight and/or waterproof when closed.

In general, the at least one first casing shell and the at least one second casing shell can each be made of plastic.

Exposed tooth-like zip fasteners can offer not only the functional aspects but also many other advantages with regard to a progressive design by reflecting innovation as a design element. Here, for example, the teeth can be made deliberately visible, conspicuous and/or distinctive, for example by specifically selecting the size, tooth shape and/or color of the teeth—for example in the form of a white robotic arm with orange-colored toothed zip fastener seams.

Specific embodiments of the invention are explained in more detail in the following description with reference to the accompanying figures. Specific features of these embodiments can represent general features of the invention regardless of the specific context in which they are mentioned, possibly also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
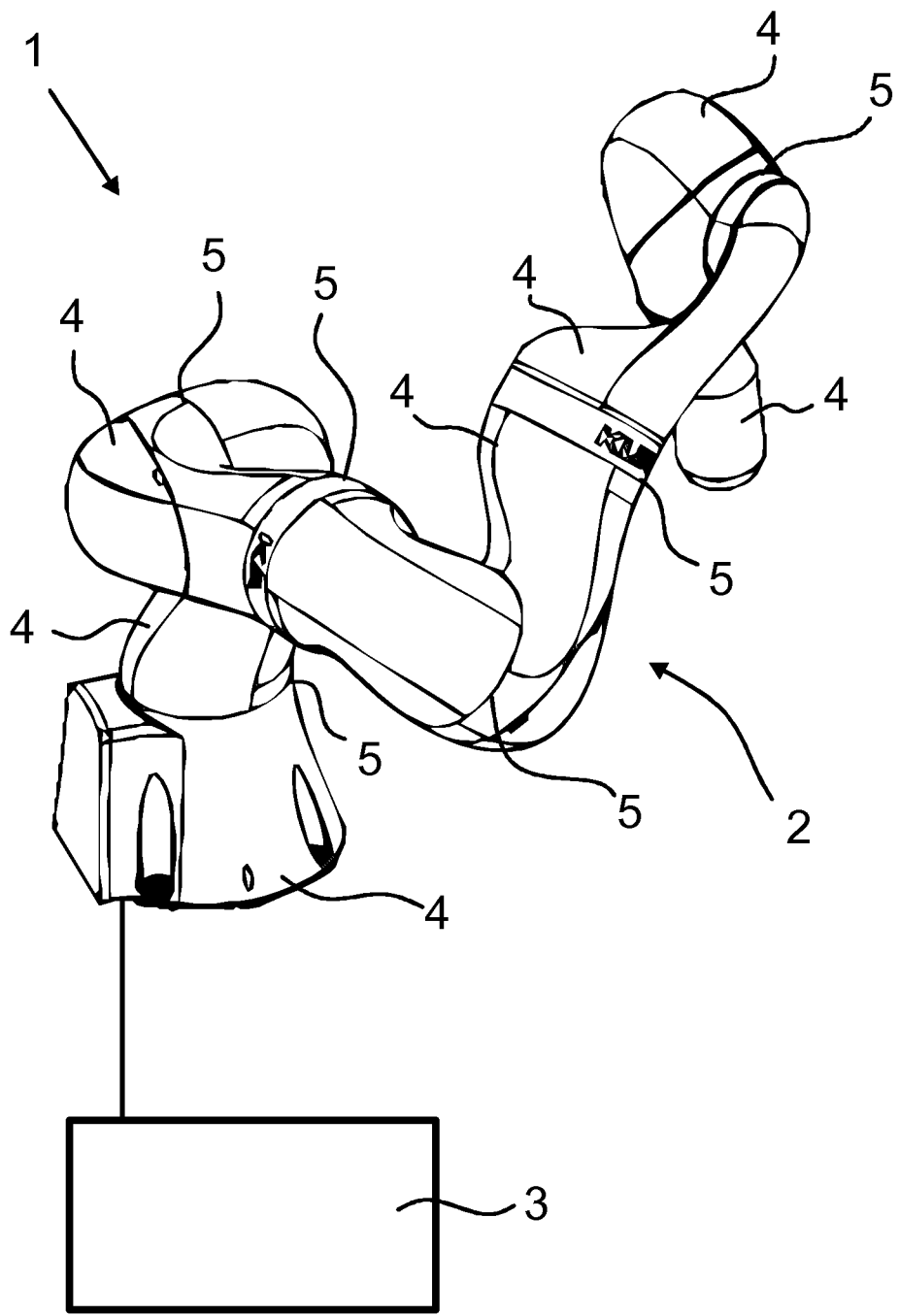
FIG. 1 shows an exemplary robotic arm with multiple joints and links connecting these joints.

FIG. 1 shows a representative embodiment of a robot 1 with a robotic arm 2 and an associated robot controller 3. The robotic arm 2 has a plurality of links 4 and joints 5 which adjust the links 4 relative to one another. Each joint 5 is driven by a motor of the robotic arm 2. The robot controller 3 is formed and configured for controlling the articulated motors in order to move the links 4 of the robot arm 2 by automatically adjusting the joints 5. The robotic arm 2 has at least one link 4 which has casing shells 6.1 and 6.2 according to the invention which are connected by means of at least one zip fastener 7. As shown in FIG. 1, several links 5 or even all links 5 of the robotic arm 2 can be equipped with casing shells 6.1 and 6.2 according to the invention, which are connected by means of at least one zip fastener 7.

Accordingly, the robotic arm 2 has a plurality of joints 5 and a plurality of links 4, which each connect two adjacent joints 5 to one another in a fixed arrangement, at least one of the links 4 having at least one first casing shell 6.1 and at least one second casing shell 6.2, and the first casing shell 6.1 being connected by connecting means which have at least one zip fastener 7 in a form-fitting manner to the second casing shell 6.2 to form a hollow member 4.

Figure 10:
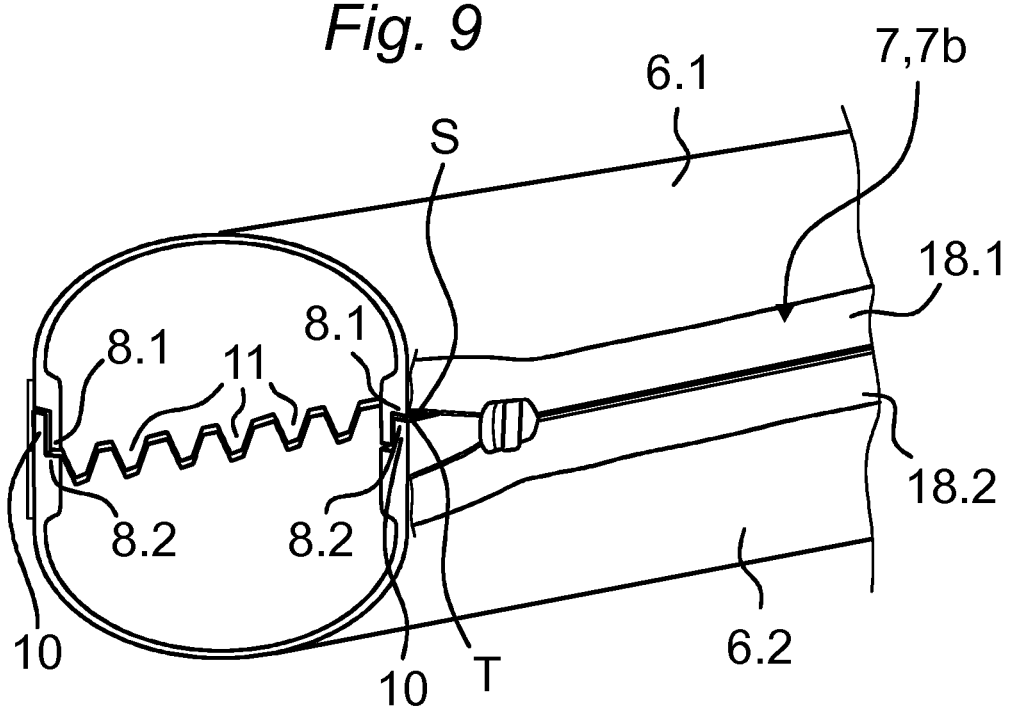
FIG. 10 illustrates the fourth embodiment with toothed connecting edges and mating connecting edges in conjunction with interlocking ribs in a modified version with sliding locking strips.

The zip fastener 7 can, as shown in FIGS. 2, 3, 7a and 13a-d, be a toothed zip fastener 7a. Alternatively, also in combination with the variants of the other figures, the zip fastener 7, as shown in FIGS. 4 and 10, can be a toothless zip fastener 7b. The toothless zip fastener 7b can, for example, have a pair of sliding closure strips and/or a pair of pressure closure strips.

The zip fastener 7 has a first band 18.1 which is attached to the first casing shell 6.1 and has a second band 18.2 which is attached to the second casing shell 6.2, such that the zip fastener 7 in its closed state covers at least one gap section S in the separating plane T between the first casing shell 6.1 and the second casing shell 6.2.

Figure 2:
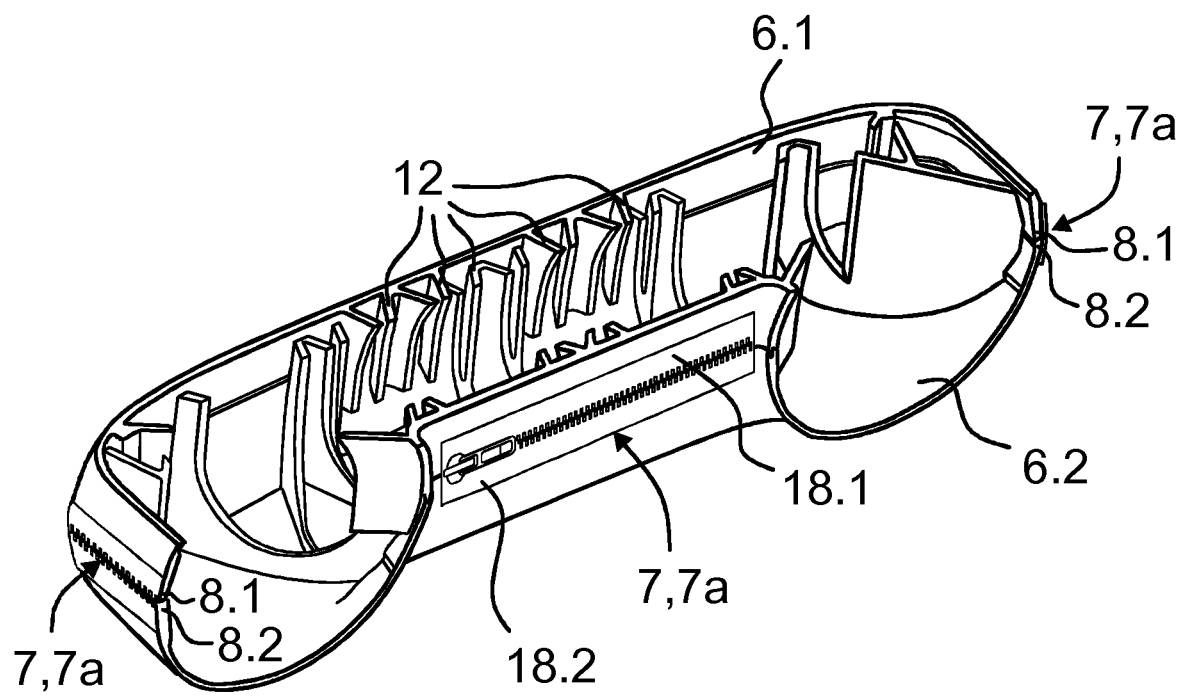
FIG. 2 depicts a schematic partial sectional view through a representative member of a robotic arm with two casing shells, which are connected by means of zip fasteners, in a first embodiment.

In a first embodiment, for example according to FIG. 2, the first casing shell 6.1 has a connecting edge 8.1, the second casing shell 6.2 has a mating connecting edge 8.2, which in an assembled state of the first casing shell 6.1 and the second casing shell 6.2 rests on the connecting edge 8.1 of the first casing shell 6.1, and the zip fastener 7, 7a is formed to absorb both shear forces along connecting edge 8.1 and mating connecting edge 8.2, as well as shear forces transverse to connecting edge 8.1 and mating connecting edge 8.2, and tensile forces perpendicular to the plane of connecting edge 8.1 and mating connecting edge 8.2.

Figure 3:
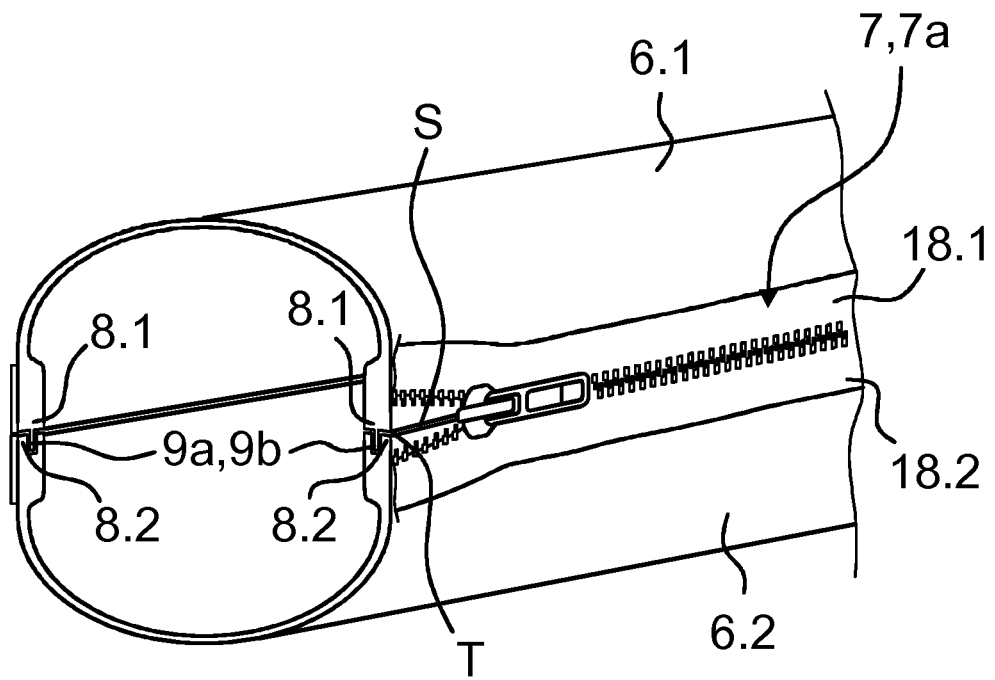
FIG. 3 depicts a second embodiment with groove-like offset connecting edges and mating connecting edges in a version with a toothed zip fastener.
Figure 4:
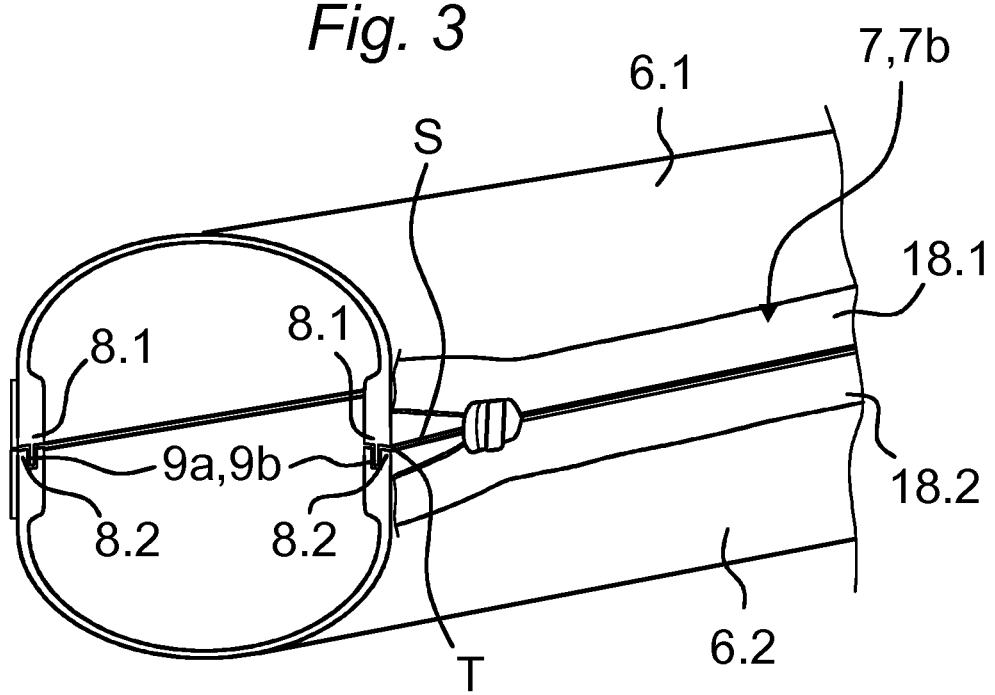
FIG. 4 illustrates the second embodiment with groove-like offset connecting edges and mating connecting edges in a modified version with sliding locking strips.

In a second embodiment, for example according to FIG. 3 and FIG. 4, the connecting edge 8.1 of the first casing shell 6.1 and the mating connecting edge 8.2 of the second casing shell 6.2 are correspondingly formed to be offset to transmit shear forces across the connecting edge 8.1 and mating connecting edge 8.2 by means of a pin connection 9a or tongue and groove connection 9b, and the zip fastener 7 is formed to absorb both shear forces along the connecting edge 8.1 and mating connecting edge 8.2 and tensile forces perpendicular to the plane of connecting edge 8.1 and mating connecting edge 8.2. In the case of the embodiment variant according to FIG. 3, the zip fastener 7 is formed as a toothed zip fastener 7a. In the case of the variant embodiment according to FIG. 4, however, the zip fastener 7 is formed as a toothless zip fastener 7b. The toothless zip fastener 7b can, for example, have a pair of sliding closure strips and/or a pair of pressure closure strips.

The connecting edge 8.1 of the first casing shell 6.1 and the mating connecting edge 8.2 of the second casing shell 6.2 can be correspondingly formed to be offset to transfer shear forces transversely to the connecting edge 8.1 and the mating connecting edge 8.2 in that the connecting edge 8.1 of the first casing shell 6.1 and/or the mating connecting edge 8.2 of the second casing shell 6.2 has a protruding rib 10 on which the respective other casing shell 6.1, 6.2 rests flush, as is also the case in the other, fourth embodiment according to FIGS. 5 to 8.

Figure 9:
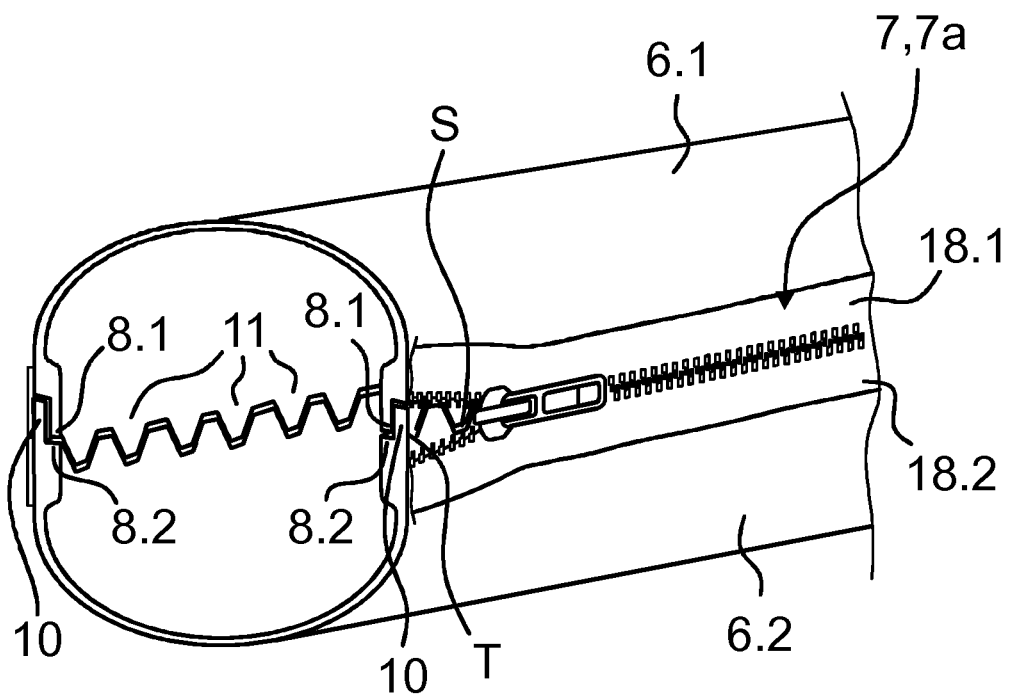
FIG. 9 depicts a fourth embodiment with toothed connecting edges and mating connecting edges in conjunction with interlocking ribs in a version with a toothed zip fastener.

In a third embodiment, for example according to FIG. 9 and FIG. 10, the connecting edge 8.1 of the first casing shell 6.1 and the mating connecting edge 8.2 of the second casing shell 6.2 are correspondingly formed with form-fittingly interlocking teeth 11 to transmit shear forces along the connecting edge 6.1 and the mating connecting edge 6.2, and the zip fastener 7 is formed to absorb both shear forces transverse to the connecting edge 8.1 and mating connecting edge 8.2 and tensile forces perpendicular to the plane of connecting edge 8.1 and mating connecting edge 8.2. In the case of the embodiment variant according to FIG. 9, the zip fastener 7 is formed as a toothed zip fastener 7a. In the case of the embodiment variant according to FIG. 10, however, the zip fastener 7 is designed as a toothless zip fastener 7b. The toothless zip fastener 7b can, for example, have a pair of sliding closure strips and/or a pair of pressure closure strips.

To form the form-fittingly interlocking teeth 11, the first casing shell 6.1 can have teeth 11 protruding from its connecting edge 8.1, which have beveled tooth flanks in the longitudinal direction of the connecting edge 8.1, in such a way that the teeth 11 taper from the tooth base in the direction of the tooth head, and the second casing shell 6.2 can have opposing teeth protruding from its mating connecting edge 8.2, which in the longitudinal direction of the mating connecting edge 8.2 have opposing tooth flanks correspondingly beveled toward the teeth 11 of the first casing shell 6.1, in such a way that the opposing teeth taper from the tooth base in the direction of the tooth head, and in an assembled state of the first casing shell 6.1 and second casing shell 6.2, the tooth flanks are flush against the opposing tooth flanks.

In a fourth embodiment, for example according to FIGS. 9 and 10, the connecting edge 8.1 of the first casing shell 6.1 and the mating connecting edge 8.2 of the second casing shell 6.2 are correspondingly formed with form-fittingly interlocking teeth 11 to transmit shear forces along the connecting edge 8.1 and mating connecting edge 8.2, and shearing forces transverse to the connecting edge 8.1 and mating connecting edge 8.2, and the zip fastener 7 is formed to absorb only tensile forces perpendicular to the plane of connecting edge 8.1 and mating connecting edge 8.2. In the case of the embodiment variant according to FIG. 7, the zip fastener 7 is designed as a toothed zip fastener 7a. In the case of the variant embodiment according to FIG. 10, on the other hand, the zip fastener 7 is designed as a toothless zip fastener 7b. The toothless zip fastener 7b can, for example, have a pair of sliding closure strips and/or a pair of pressure closure strips.

Figure 11:
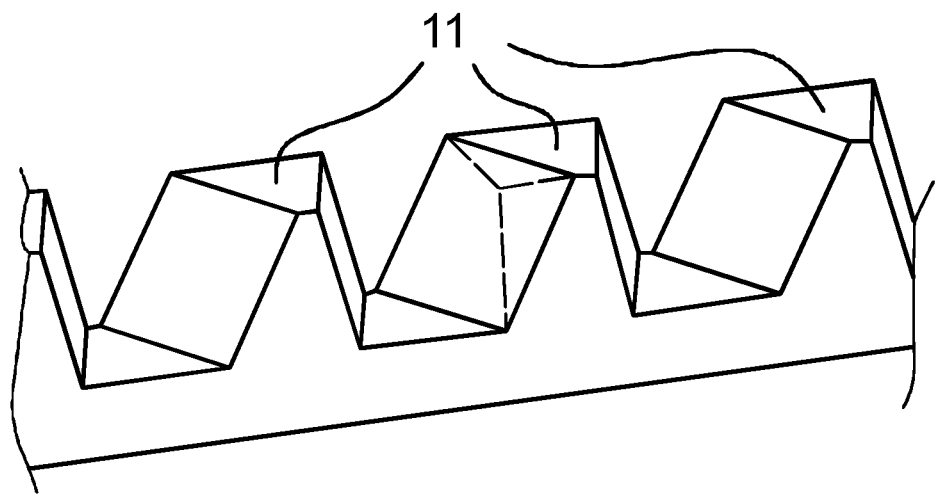
FIG. 11 is an enlarged partial view of a connecting edge of one casing half with teeth that are beveled both in the longitudinal direction of the connecting edge and transversely to the longitudinal direction of the connecting edge.

To form the form-fittingly interlocking teeth 11, the first casing shell 6.1 has teeth 11 protruding from its connecting edge 8.1, which have beveled tooth flanks in the longitudinal and transverse directions of the connecting edge 8.1, in such a way that the teeth 11 extend both from the tooth base in the direction of the tooth tip and taper in the transverse direction, as is also shown enlarged in FIG. 11, and the second casing shell 6.2 has opposing teeth protruding from its mating connecting edge 8.2, which have opposing tooth flanks correspondingly beveled toward the teeth 11 of the first casing shell 6.1 in the longitudinal direction and transverse direction of the mating connecting edge 8.2, such that the opposing teeth taper both from the tooth base in the direction of the tooth tip and in the transverse direction, and when the first casing shell 6.1 and the second casing shell 6.2 are joined together, the tooth flanks are flush with the opposing tooth flanks.

Figure 12:
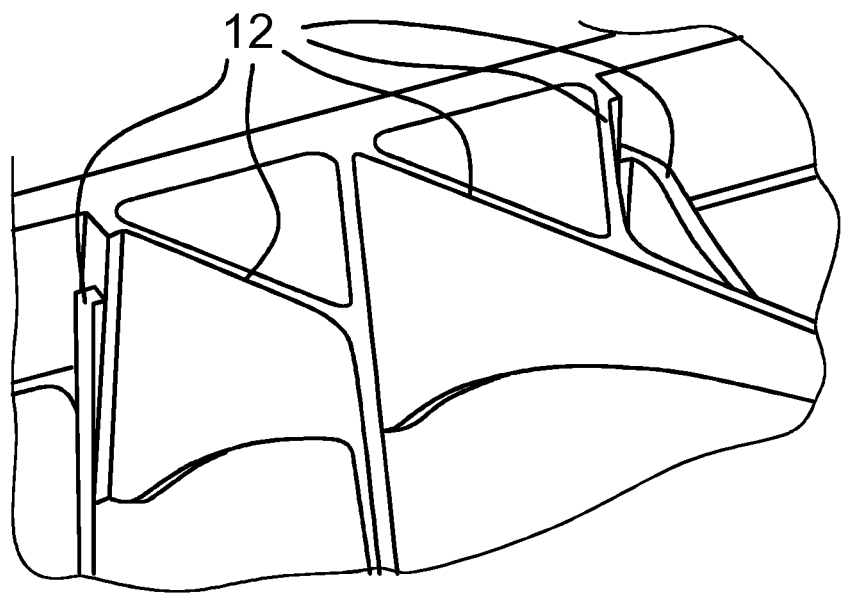
FIG. 12 is an enlarged partial view of the connecting edge of one casing half and the mating connecting edge of the other casing half with interlocking stiffening ribs.

In a fifth embodiment, for example according to FIG. 12, the first casing shell 6.1 and the second casing shell 6.2 are correspondingly formed with form-fittingly interlocking, internal ribs 12 to transmit shear forces along the connecting edge 8.1 and mating connecting edge 8.2, and shear forces transverse to the connecting edge 8.1 and mating connecting edge 8.2, and the zip fastener 7 is formed to absorb only tensile forces perpendicular to the plane of the connecting edge 8.1 and the mating connecting edge 8.2. Also in the fifth embodiment, the zip fastener 7 can be a toothed zip fastener 7a. Alternatively, in the fifth embodiment, the zip fastener 7 can be a toothless zip fastener 7b. The toothless zip fastener 7b can, for example, have a pair of sliding closure strips and/or a pair of pressure closure strips.

In all embodiments and variants, the first casing shell 6.1 can have on its outer jacket wall a receiving channel which adjoins the connecting edge 8.1 and extends longitudinally along the connecting edge 8.1, which is formed to receive the zip fastener 7 at least substantially flush with the outer jacket wall, and/or the second casing shell 6.2 can have on its outer jacket wall a receiving channel that adjoins the mating connecting edge 8.2 and extends longitudinally along the mating connecting edge 8.2 and is designed to receive the zip fastener 7 at least substantially flush with the outer jacket wall.

In all the embodiments and variants, the at least one first casing shell 6.1 and the at least one second casing shell 6.2 can each be made of plastic.

Figure 13:
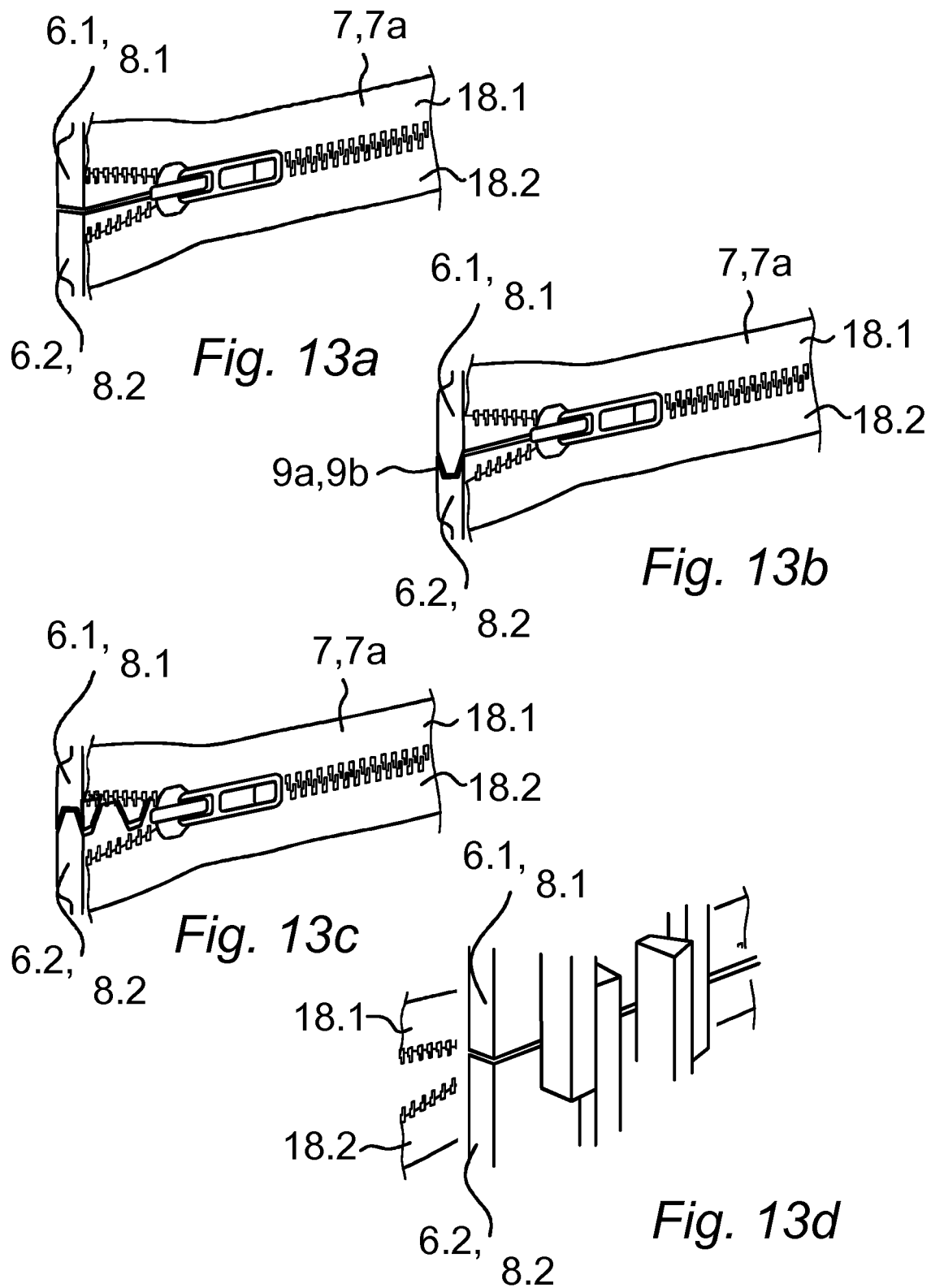
FIGS. 13a-d illustrate various alternative variants in which the connecting edges of the adjacent casing halves are formed differently.
Figure 14:
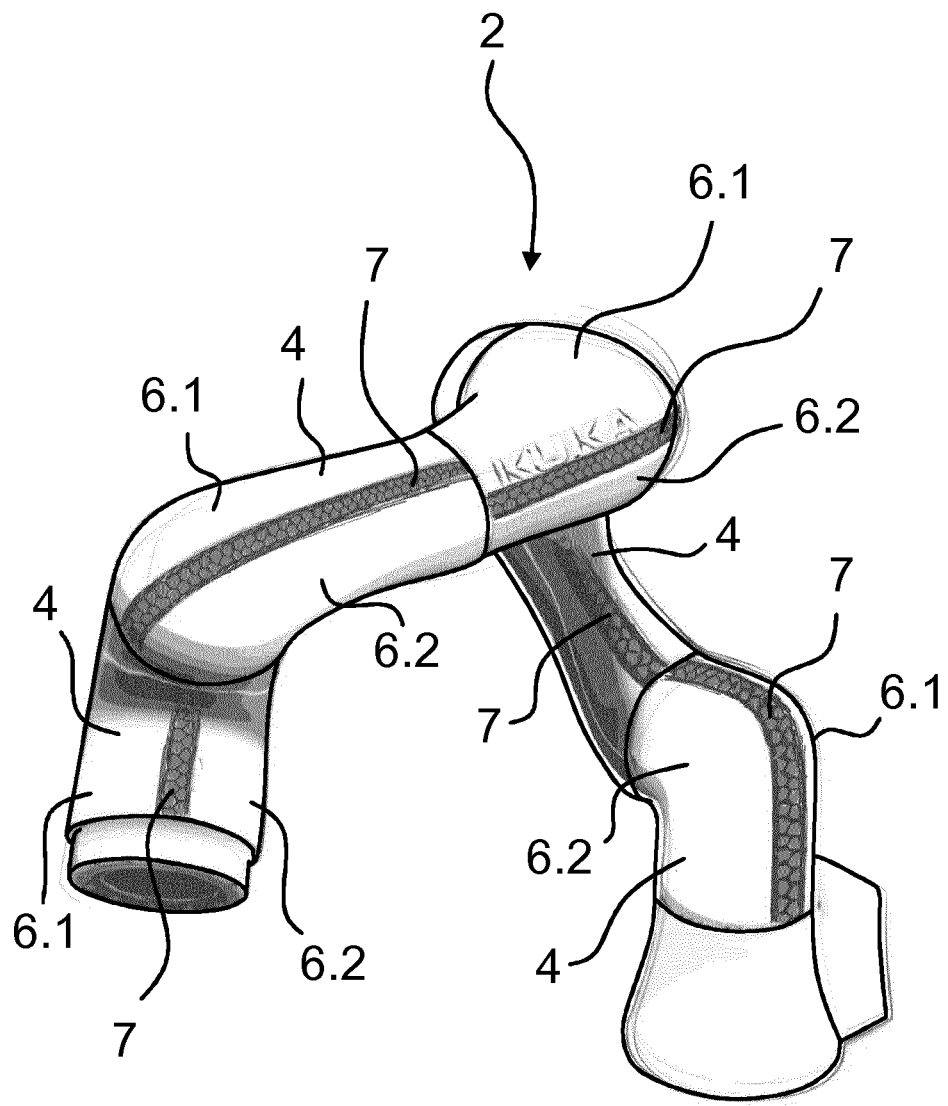
FIG. 14 depicts an alternative embodiment of a robotic arm with visible zip fasteners.

In the various alternative variants, for example according to FIG. 13b and FIG. 13c, the connecting edge 8.1 of the first casing shell 6.1 and the mating connecting edge 8.2 of the second casing shell 6.2 are correspondingly formed to be offset to transmit shear forces across the connecting edge 8.1 and mating connecting edge 8.2 by means of a pin connection 9a or tongue and groove connection 9b.

The alternative variant according to FIG. 13a has a flat connecting edge 8.1 of the first casing shell 6.1 and a flat mating connecting edge 8.2 of the second casing shell 6.2 analogous to FIG. 2.

Figure 5:
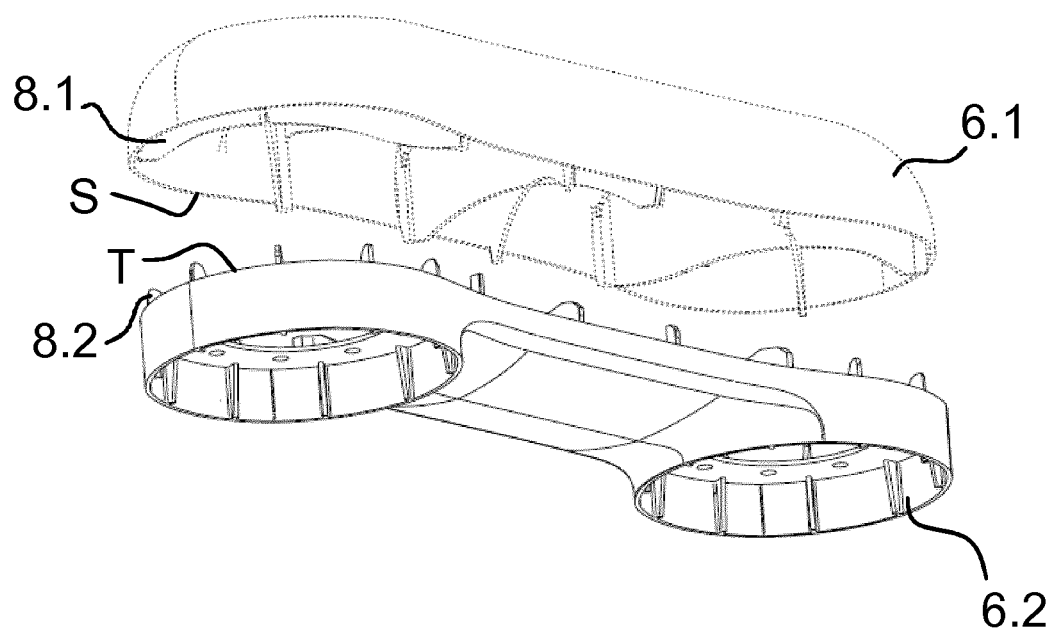
FIG. 5 depicts a third embodiment with smooth connecting edges and mating connecting edges in a version with interlocking retaining ribs as stiffening ribs in an exploded view from below, with the zip fastener omitted.
Figure 6:
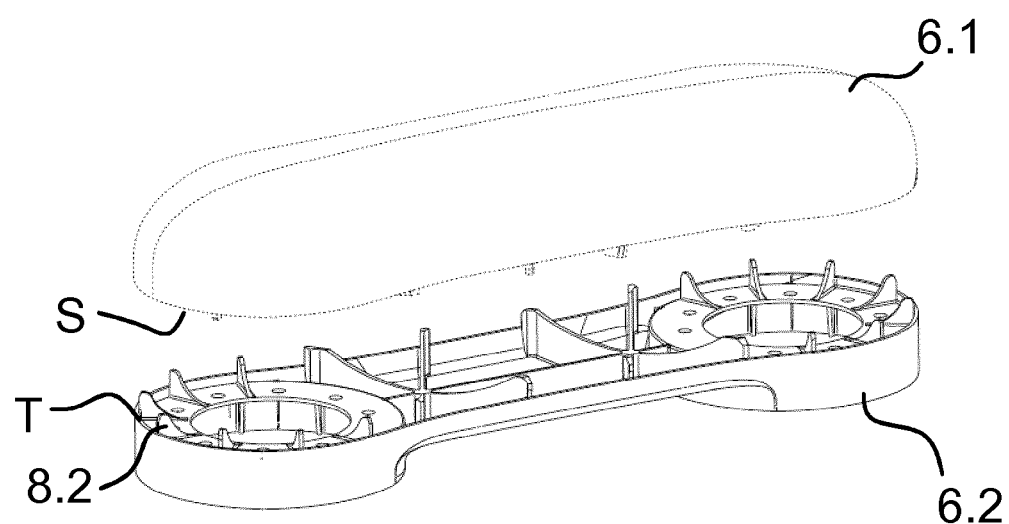
FIG. 6 depicts a third embodiment with smooth connecting edges and mating connecting edges in a version with interlocking retaining ribs as stiffening ribs in an exploded view from above, with the zip fastener omitted.
Figure 7A:
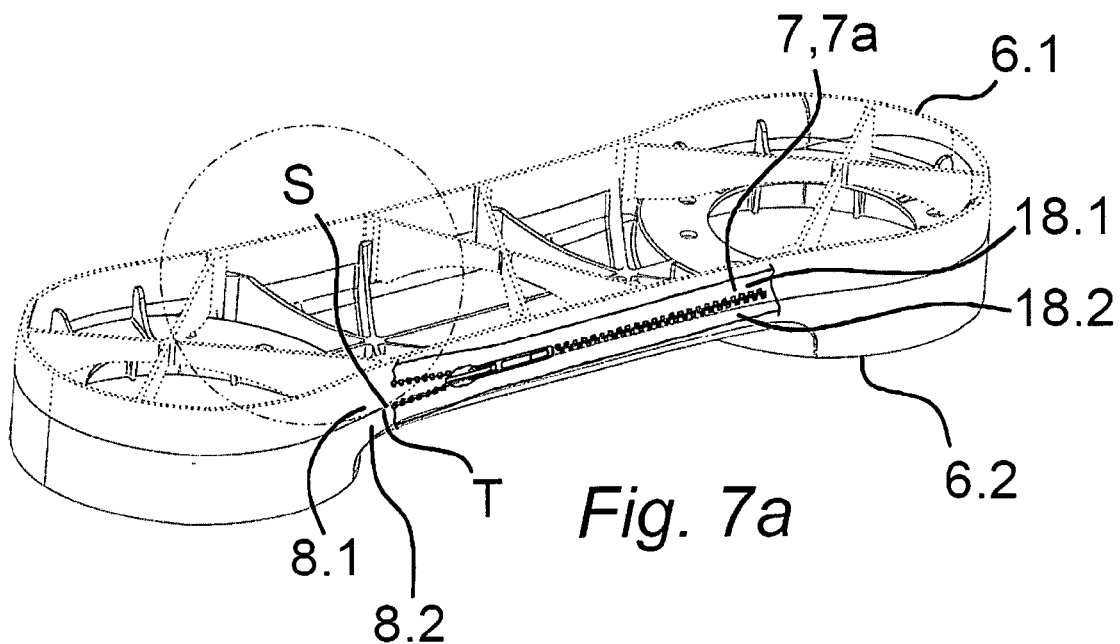
FIGS. 7a-b illustrate the third embodiment according to FIG. 5 and FIG. 6 with a toothed zip fastener in FIG. 7a and in FIG. 7b with an untoothed zip fastener.
Figure 7B:
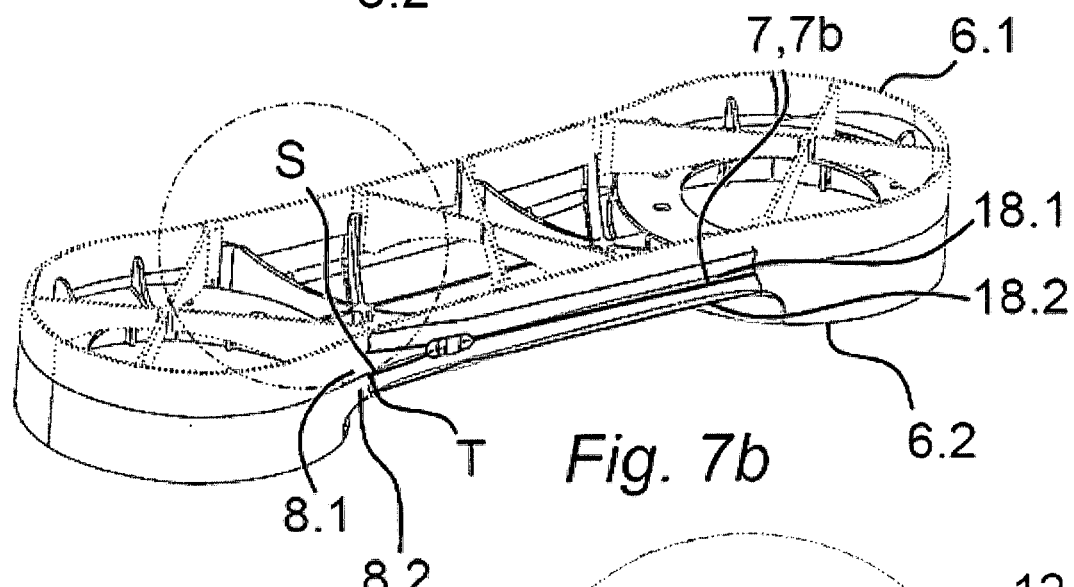
Figure 8:
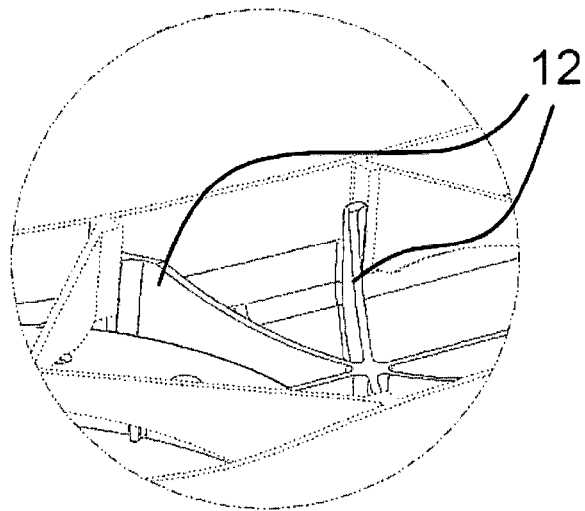
FIG. 8 is an enlarged partial illustration of the retaining ribs or the stiffening ribs of the third embodiment according to FIGS. 5 to 7b.

The alternative variant according to FIG. 13d has, in connection with flat connecting edges 8.1, 8.2, i.e. a simple joint, and additionally interlocking retaining ribs as stiffening ribs 12, which can be designed similar to the version according to FIGS. 5 and 6.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robotic arm, comprising:
   a plurality of links and a plurality of joints, each joint connecting two adjacent links to one another in a fixed arrangement;
   a drive motor associated with each joint and configured to drive the joint to adjust the respective links relative to one another;
   at least one of the links comprising:
      at least one first casing shell,
      at least one second casing shell, and
      connecting structure connecting the at least one first casing shell with the at least one second casing shell in a form-fitting manner in order to form a hollow member;
   wherein the connecting structure comprises at least one zip fastener.

2. The robotic arm of claim 1, wherein the zip fastener is at least one of a toothed zip fastener, a toothless zip fastener, a pair of sliding closure strips, or a pair of pressure closure strips.

3. The robotic arm of claim 1, wherein the zip fastener comprises:
   a first band attached to the first casing shell; and
   a second band attached to the second casing shell;
   wherein the zip fastener, in a closed state, covers at least one gap section in a separating plane between the first casing shell and the second casing shell.

4. The robotic arm of claim 1, further comprising:
   a first connecting edge on the first casing shell; and
   a second connecting edge on the second casing shell, the second connecting edge resting on the first connecting edge in an assembled state of the first casing shell and the second casing shell;
   wherein the zip fastener is configured to absorb both shear forces along the first connecting edge and the second connecting edge, and shear forces transverse to the first connecting edge and second connecting edge, as well as tensile forces perpendicular to a separating plane of the first connecting edge and the second connecting edge.

5. The robotic arm of claim 1, further comprising:
   a first connecting edge on the first casing shell; and
   a second connecting edge on the second casing shell, the second connecting edge resting on the first connecting edge in an assembled state of the first casing shell and the second casing shell;
   wherein the first connecting edge and the second connecting edge are correspondingly formed to be offset to thereby transmit shear forces transverse to the first connecting edge and the second connecting edge; and
   the zip fastener is configured to absorb both shear forces along the first connecting edge and the second connecting edge, and tensile forces perpendicular to a separating plane of the first connecting edge and the second connecting edge.

6. The robotic arm of claim 5, wherein the first connecting edge and the second connecting edge are offset by one of a pin connection, or a tongue and groove connection.

7. The robotic arm of claim 5, wherein the first connecting edge and the second connecting edge are offset to transmit shear forces transverse to the first connecting edge and the second connecting edge by at least one of the first connecting edge or the second connecting edge having a protruding rib against which the casing shell associated with the other of the first or second connecting edge rests flush.

8. The robotic arm of claim 1, further comprising:
   a first connecting edge on the first casing shell; and
   a second connecting edge on the second casing shell, the second connecting edge resting on the first connecting edge in an assembled state of the first casing shell and the second casing shell;
   wherein the first casing shell and the second casing shell are correspondingly formed with form-fittingly interlocking, internal stiffening ribs to thereby transmit shear forces along the first connecting edge and the second connecting edge, and transmit shear forces transverse to the first connecting edge and the second connecting edge; and
   the zip fastener is configured to absorb only tensile forces perpendicular to a separating plane of the first connecting edge and the second connecting edge.

9. The robotic arm of claim 1, further comprising:
   a first connecting edge on the first casing shell; and
   a second connecting edge on the second casing shell, the second connecting edge resting on the first connecting edge in an assembled state of the first casing shell and the second casing shell;
   wherein the first connecting edge and the second connecting edge are correspondingly formed with form-fittingly interlocking teeth to thereby transmit shear forces along the first connecting edge and the second connecting edge; and
   wherein the zip fastener is configured to absorb both shear forces transverse to the first connecting edge and the second connecting edge, and tensile forces perpendicular to a separating plane of the first connecting edge and the second connecting edge;
   wherein the first casing shell has first teeth protruding from the first connecting edge, the first teeth having first tooth flanks beveled in a longitudinal direction of the first connecting edge to form the form-fittingly interlocking teeth in such a way that the first teeth taper from corresponding first tooth bases in a direction of corresponding first tooth tips; and
   wherein the second casing shell has second teeth protruding from the second connecting edge and opposing the first teeth, the second teeth having second tooth flanks correspondingly beveled towards the first teeth of the first casing shell in a longitudinal direction of the second connecting edge, such that the second teeth taper from corresponding second tooth bases in a direction of corresponding second tooth tips and, in an assembled state of the first casing shell and the second casing shell, the first tooth flanks are flush with the second tooth flanks.

10. The robotic arm of claim 1, further comprising:
    a first connecting edge on the first casing shell; and
    a second connecting edge on the second casing shell, the second connecting edge resting on the first connecting edge in an assembled state of the first casing shell and the second casing shell;
    wherein the first connecting edge and the second connecting edge are correspondingly formed with form-fittingly interlocking teeth to thereby transmit shear forces along the first connecting edge and the second connecting edge, and to transmit shear forces transverse to the first connecting edge and the second connecting edge; and wherein the zip fastener is configured to absorb only tensile forces perpendicular to a separating plane of the first connecting edge and the second connecting edge.

11. The robotic arm of claim 10, wherein:

the first casing shell has first teeth protruding from the first connecting edge and which have first tooth flanks beveled in longitudinal and transverse directions of the first connecting edge to form the form-fittingly interlocking teeth, in such a way that the first teeth taper from corresponding first tooth bases in a direction of corresponding first tooth tips as well as in a transverse direction; and the second casing shell has second teeth protruding from the second connecting edge and opposing the first teeth, the second teeth having second tooth flanks correspondingly beveled in longitudinal and transverse directions of the second connecting edge towards the first teeth of the first casing shell, such that the second teeth taper from corresponding second tooth bases in both directions of corresponding second tooth tips and in transverse directions, and, in an assembled state of the first casing shell and the second casing shell, the first tooth flanks are flush with the second tooth flanks.

12. The robotic arm of claim 1, further comprising:

a first connecting edge on the first casing shell; and a second connecting edge on the second casing shell, the second connecting edge resting on the first connecting edge in an assembled state of the first casing shell and the second casing shell; and at least one of:

a first receiving channel on a first outer jacket wall of the first casing shell, the first receiving channel adjoining the first connecting edge and extending longitudinally along the first connecting edge, the first receiving channel configured to receive the zip fastener at least substantially flush with the first outer jacket wall, or a second receiving channel on a second outer jacket wall of the second casing shell, the second receiving channel adjoining the second connecting edge and extending longitudinally along the second connecting edge, the second receiving channel configured to receive the zip fastener at least substantially flush with the second outer jacket wall.

13. The robotic arm of claim 1, wherein the at least one first casing shell and the at least one second casing shell are each made from plastic material.

* * * * *